US008511082B2

(12) United States Patent
Browne et al.

(10) Patent No.: US 8,511,082 B2
(45) Date of Patent: Aug. 20, 2013

(54) HEAT TRANSPORT SYSTEM AND METHOD

(75) Inventors: Alan L. Browne, Grosse Pointe, MI (US); Marten Wittorf, Ingelheim (DE); Nancy L. Johnson, Northville, MI (US); Patrick B. Usoro, Troy, MI (US); Paul W. Alexander, Ypsilanti, MI (US); James Holbrook Brown, Costa Mesa, CA (US); Xiujie Gao, Troy, MI (US)

(73) Assignees: GM Global Technology Operations LLC, Detroit, MI (US); Dynalloy, Inc., Costa Mesa, CA (US)

( * ) Notice: Subject to any disclaimer, the term of this patent is extended or adjusted under 35 U.S.C. 154(b) by 703 days.

(21) Appl. No.: 12/639,527

(22) Filed: Dec. 16, 2009

(65) Prior Publication Data
US 2011/0139395 A1    Jun. 16, 2011

(51) Int. Cl.
*F01B 29/10* (2006.01)
*F02G 1/04* (2006.01)

(52) U.S. Cl.
USPC ........................................................ 60/527

(58) Field of Classification Search
USPC .................................................. 60/527–529
See application file for complete search history.

(56) References Cited

U.S. PATENT DOCUMENTS

| | | | | |
|---|---|---|---|---|
| 4,055,955 A * | 11/1977 | Johnson | ............................ | 60/527 |
| 4,150,544 A * | 4/1979 | Pachter | ............................ | 60/527 |
| 4,785,627 A * | 11/1988 | Al-Jaroudi | ....................... | 60/527 |
| 4,996,842 A * | 3/1991 | Goldstein | ......................... | 60/527 |
| 5,003,779 A * | 4/1991 | Goldstein | ......................... | 60/527 |
| 5,327,987 A * | 7/1994 | Abdelmalek | ............... | 180/65.25 |
| 5,442,914 A * | 8/1995 | Otsuka | ............................ | 60/527 |
| 6,367,281 B1 * | 4/2002 | Hugenroth | ....................... | 62/467 |
| 7,444,812 B2 * | 11/2008 | Kirkpatirck et al. | ............. | 60/528 |
| 2006/0162331 A1 * | 7/2006 | Kirkpatirck et al. | ............. | 60/527 |
| 2009/0021106 A1 * | 1/2009 | Baughman et al. | ............ | 310/300 |
| 2009/0043288 A1 * | 2/2009 | Petrakis | ...................... | 604/890.1 |
| 2009/0277169 A1 * | 11/2009 | Usoro et al. | ..................... | 60/527 |
| 2011/0139395 A1 * | 6/2011 | Browne et al. | ................... | 165/41 |
| 2011/0139396 A1 * | 6/2011 | Browne et al. | ................... | 165/41 |
| 2011/0165981 A1 * | 7/2011 | Alexander et al. | ............ | 474/202 |

OTHER PUBLICATIONS

Kauffman, George B. Memory Metal, Oct. 1993. American Chemical Society. ChemMatters, p. 4.*

* cited by examiner

*Primary Examiner* — Thomas Denion
*Assistant Examiner* — Brian Inacay
(74) *Attorney, Agent, or Firm* — Quinn Law Group, PLLC

(57) ABSTRACT

A heat transport system includes a fluid, a heat engine, and a component. The fluid has a first fluid region at a first temperature and a second fluid region at a second temperature that is different from the first temperature. The heat engine includes a shape-memory alloy disposed in contact with each of the first fluid region and the second fluid region. The heat engine is operable to transfer heat from one of the first fluid region and the second fluid region to the other of the first fluid region and the second fluid region in response to the crystallographic phase of the shape-memory alloy.

14 Claims, 2 Drawing Sheets

HEAT TRANSPORT SYSTEM AND METHOD

TECHNICAL FIELD

The present invention generally relates to a heat transport system, and more specifically, to an arrangement for heating or cooling a component or region using the heat transport system.

BACKGROUND OF THE INVENTION

Vehicles are traditionally powered by engines and batteries, which provide power for starting the engine and for vehicle accessories. The vehicle systems and accessory systems generate heat and require cooling. Utilizing the main vehicle power sources to cool these systems detracts from the overall vehicle fuel economy. However, arrangements for extending the fuel economy of a vehicle are desirable in light of the growing concern for fuel efficient vehicles.

Additionally, in cold climates vehicle components operate more efficiently once a minimum operating temperature is reached. However, not all components reach ideal operating temperatures at the same rate. In order to operate at maximum efficiency these components must be heated.

Therefore, an arrangement to heat or cool the vehicle components and accessories that reduces the power load on the traditional power sources of the vehicle, such as the battery and the engine is desirable.

SUMMARY OF THE INVENTION

A vehicle includes a first fluid region having a first temperature and a second fluid region having a second temperature that is different from said first temperature. A heat engine which includes a shape-memory alloy is located within a compartment of the vehicle. The heat engine is operable to transfer heat from one of the first fluid region and the second fluid region to the other of the first fluid region and the second fluid region in response to the crystallographic phase of the shape-memory alloy. A first component is located in one of the first fluid region and the second fluid region, and the heat engine transfers heat from the respective one of the first fluid region and the second fluid region to the other of the first fluid region and the second fluid region to thereby change a temperature of the first component.

A heat transport system includes a fluid and a heat engine. The fluid has a first fluid region at a first temperature and a second fluid region at a second temperature that is different from the first temperature. The heat engine includes a shape-memory alloy disposed in heat exchange contact with each of the first fluid region and the second fluid region. The heat engine is operable to transfer heat from one of the first fluid region and the second fluid region to the other of the first fluid region and the second fluid region in response to the crystallographic phase of the shape-memory alloy.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
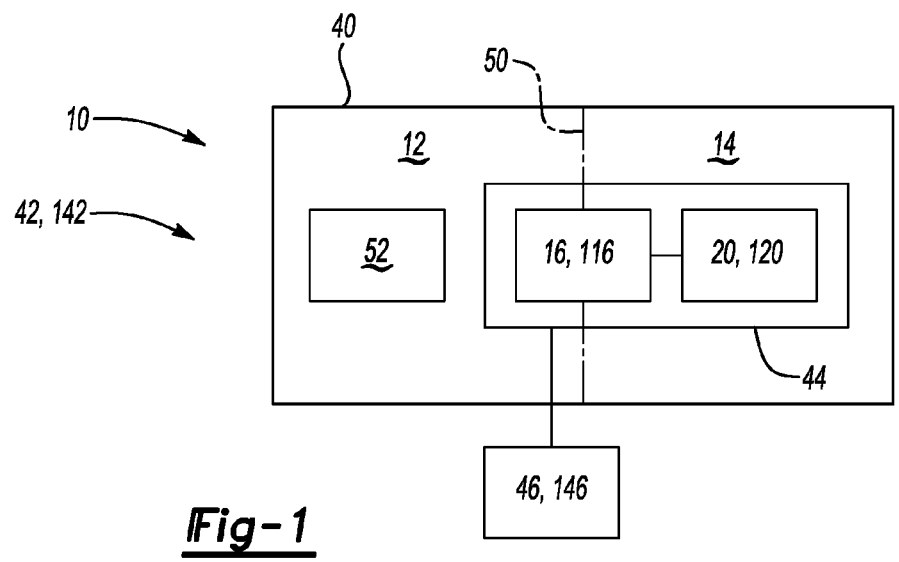
FIG. 1 is a schematic diagram of a vehicle having a heat transport system.

Referring to the Figures, wherein like reference numerals refer to like elements, a vehicle is shown generally at 10 in FIG. 1. The vehicle 10 includes a heat transport system 42. The heat transport system 42 utilizes the temperature difference between a first fluid region 12 and a second fluid region 14 to drive a heat engine 16. The heat engine 16 transfers heat from one of the first fluid region 12 and the second fluid region 14 to the other of the first fluid region 12 and the second fluid region 14. A first component 52 for the vehicle 10 may be located in first fluid region 12 or the second fluid region 14 and operation of the heat engine 16 may remove heat to cool the first fluid region 12 or the second fluid region 14 and the first component 52. Alternately, the heat engine 16 may increase heat of the first fluid region 12 or the second fluid region 14 and the first component 52. It is to be appreciated that the heat transport system 42 may also be useful for non-automotive applications such as, but not limited to, household and industrial heating and cooling applications.

The vehicle 10 defines a compartment 40 which may house power and drive sources for the vehicle 10, such as an engine and transmission (not shown). The compartment 40 may or may not be enclosed from the surrounding environment, and may include regions and components exterior to the vehicle 10 such as exhaust pipe and catalytic converter, shock absorbers, brakes, and any other region where energy is dissipated as heat proximate to or in the vehicle 10 such as in a passenger compartment or a battery compartment (such as in an electric vehicle).

The heat transport system 42 is at least partially located within the compartment 40. The power and drive sources (not shown) for the vehicle 10 typically generate heat. Therefore, the compartment 40 includes the first fluid region 12 and the second fluid region 14 having a temperature difference therebetween. The first fluid region 12 and the second fluid region 14 may be spaced apart from one another, or a sufficient heat exchange barrier 50, such as a heat shield, may be employed to separate the compartment 40 into the first fluid region 12 and the second fluid region 14. The fluid within the heat transport system 42 forming the first fluid region 12 and the second fluid region 14 may be selected from a group of gases, liquids, and combinations thereof. In the embodiment discussed above where the compartment 40 is an engine compartment and the fluid within the first fluid region 12 and the second fluid region 14 is air within the compartment 40.

Several examples within a vehicle 10 where the heat transport system 42 may take advantage of temperature differentials involve placing a portion of the cooling system 42 in proximity to the first component 52 to remove or add heat to the first component 52 and the surrounding fluid. In the embodiment shown, the first component 52 is located in the first fluid region 12 and the cooling system 42 operates to move heat from the first fluid region 12 to the second fluid region 14 to change the temperature of the first component 52 and the first fluid region 12. The first component 52 may be, for example, a catalytic converter, a battery for the vehicle or a battery compartment for electric vehicles, a transmission, brakes, or a heat exchanger, such as a radiator. The heat transport system 42 may be positioned such that the other of the first fluid region 12 or the second fluid region 14 is located remotely or separated by the sufficient heat exchange barrier 50 to provide the required temperature differential. The above list only contains examples of where the heat transport system 10 may be located and is not intended to be all inclusive of arrangements for the heat transport system 42. One skilled in the art would be able to determine areas having an associated temperature differential and an appropriate position for the heat transport system 42 to take advantage of the temperature differences to cool or heat the first component 52 or first fluid region 12.

Figure 2:
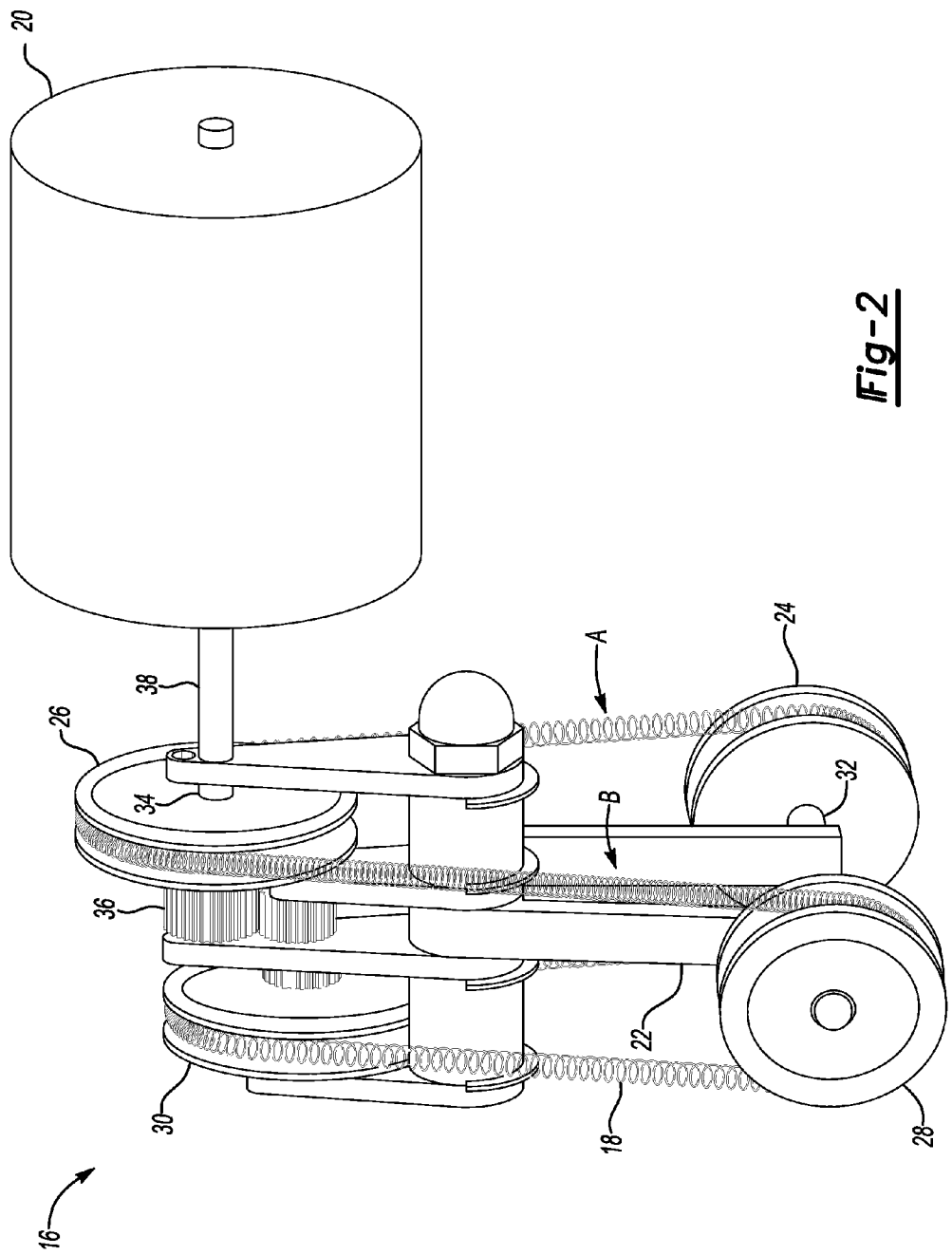
FIG. 2 is a perspective view of a first embodiment of the heat transport system of FIG. 1.

Referring now to FIGS. 1 and 2, the heat transport system 42 includes the heat engine 16. The heat engine 16 is configured for converting thermal energy, e.g., heat, to mechanical energy, as set forth in more detail below. More specifically, the heat engine 16 includes a shape-memory alloy 18 (FIG. 2) having a crystallographic phase changeable between austenite and martensite in response to the temperature difference of the first fluid region 12 and the second fluid region 14 (FIG. 1). Operation of the heat engine 16 causes heat to move from one of the first fluid region 12 and the second fluid region 14 to the other of the first fluid region 12 and the second fluid region 14.

Heat is transferred when it is absorbed by the shape-memory alloy 18 in one of the first fluid region 12 and the second fluid region 14 and when it is desorbed from the shape-memory alloy 18 in the other of the first fluid region 12 and the second fluid region 14. Additionally, the martensite to austenite phase transformation of the shape-memory alloy 18 is endothermic, and austenite to martensite transformation is exothermic. Therefore, as the shape-memory alloy 18 moves between the first fluid region 12 and the second fluid region 14 heat is transferred as the shape-memory alloy 18 undergoes the corresponding phase change.

Another way most applications transfer heat would be through the physical transport of the heat containing medium such as movement of the fluid between the first fluid region 12 and the second fluid region 14. That is, heat is transferred through the fluid currents created by the operation of the heat engine 16. If further transfer of heat from one of the first fluid region 12 and the second fluid region 14 is required a second component 20, such as a fan, may be secured to the heat engine 16 and driven thereby. The second component 20 may increase the fluid flow from one of the first fluid region 12 and the second fluid region 14 to the other of the first fluid region 12 and the second fluid region 14. Operation of the heat engine 16 is further described below.

As used herein, the terminology "shape-memory alloy" refers to alloys which exhibit a shape-memory effect. That is, the shape-memory alloy 18 may undergo a solid state phase change via crystalline rearrangement to shift between a martensite phase, i.e., "martensite", and an austenite phase, i.e., "austenite". Stated differently, the shape-memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape-memory alloy 18 begins to change from the austenite phase to the martensite phase is known as the martensite start temperature, $M_s$. The temperature at which the shape-memory alloy 18 completes the change from the austenite phase to the martensite phase is known as the martensite finish temperature, $M_f$. Similarly, as the shape-memory alloy 18 is heated, the temperature at which the shape-memory alloy 18 begins to change from the martensite phase to the austenite phase is known as the austenite start temperature, $A_s$. And, the temperature at which the shape-memory alloy 18 completes the change from the martensite phase to the austenite phase is known as the austenite finish temperature, $A_f$.

Therefore, the shape-memory alloy 18 may be characterized by a cold state, i.e., when a temperature of the shape-memory alloy 18 is below the martensite finish temperature $M_f$ of the shape-memory alloy 18. Likewise, the shape-memory alloy 18 may also be characterized by a hot state, i.e., when the temperature of the shape-memory alloy 18 is above the austenite finish temperature $A_f$ of the shape-memory alloy 18.

In operation, i.e., when exposed to the temperature difference of first fluid region 12 and the second fluid region 14, the shape-memory alloy 18, if pre-strained or subjected to tensile stress, can change dimension upon changing crystallographic phase to thereby convert thermal energy to mechanical energy. That is, the shape-memory alloy 18 may change crystallographic phase from martensite to austenite and thereby dimensionally contract if pseudoplastically pre-strained so as to convert thermal energy to mechanical energy. Conversely, the shape-memory alloy 18 may change crystallographic phase from austenite to martensite and if under stress thereby dimensionally expand so as to be pseudoplastically strained and reset to convert thermal energy to mechanical energy.

The terminology "pseudoplastically pre-strained" refers to stretching the shape-memory alloy element 18 while the shape-memory alloy element 18 is in the martensite phase so that the strain exhibited by the shape-memory alloy element 18 under loading is not fully recovered when unloaded. That is, upon unloading, the shape-memory alloy element 18 appears to have plastically deformed, but when heated to the austenite start temperature, $A_s$, the strain can be recovered so that the shape-memory alloy element 18 returns to the original length observed prior to any load being applied. Additionally, the shape-memory alloy element 18 may be stretched before installation in the heat engine 16, such that the nominal length of the shape-memory alloy 18 includes that recoverable pseudoplastic strain, which provides the motion used for driving the heat engine 16.

The shape-memory alloy 18 may have any suitable composition. In particular, the shape-memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape-memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape-memory alloy 18 can be binary, ternary, or any higher order so long as the shape-memory alloy 18 exhibits a shape memory effect, e.g., a change in shape orientation, damping capacity, and the like. A skilled artisan may select the shape-memory alloy 18 according to desired operating temperatures within the compartment 40 (FIG. 1), as set forth in more detail below. In one specific example, the shape-memory alloy 18 may include nickel and titanium.

Further, the shape-memory alloy 18 may have any suitable form, i.e., shape. For example, the shape-memory alloy 18 may have a form selected from the group including springs, tapes, wires, bands, continuous loops, and combinations thereof. Referring to FIG. 2, in one variation, the shape-memory alloy 18 may be formed as a continuous loop spring.

The shape-memory alloy 18 may convert thermal energy to mechanical energy via any suitable manner. For example, the shape-memory alloy 18 may activate a pulley system (shown generally in FIG. 2 and set forth in more detail below), engage a lever (not shown), rotate a flywheel (not shown), engage a screw (not shown), and the like.

Referring again to FIGS. 1 and 2, the heat transport system 42 may include the driven second component 20. The second component 20 may be a simple mechanical device, such as a fan, which is driven by the heat engine 16 to increase the fluid flow between the first fluid region 12 and the second fluid region 14 (shown in FIG. 1). The mechanical energy from the heat engine 16 may drive the second component 20. Driving the second component 20 with power provided by the heat engine 16 allows the cooling system 42 to operate autonomously from other systems of the vehicle 10. Additionally, reducing the temperature of the first component 52 may also allow an existing system within the vehicle 10 to be decreased in size/capacity or require reduced operating time and power. For example, the heat engine 16 may assist in cooling a vehicle engine and, thus, decrease the cooling load required by the main heating/cooling system of the vehicle.

Referring to FIG. 2, the second component 20 is driven by the heat engine 16 as the heat engine 16 operates to heat or cool the first component 52, the first fluid region 12 or the second fluid region 14. That is, mechanical energy resulting from the conversion of thermal energy by the shape-memory alloy 18 may drive the second component 20. In particular, the aforementioned dimensional contraction and the dimensional expansion of the shape-memory alloy 18 coupled with the changes in modulus may drive the heat engine 16. As explained above, operation of the heat engine 16 also transfers heat from the first fluid region 12 or the second fluid region 14 to the other of the first fluid region 12 or the second fluid region 14.

In one variation shown in FIG. 2, the heat engine 16 may include a frame 22 configured for supporting one or more wheels 24, 26, 28, 30 disposed on a plurality of axles 32, 34. The wheels 24, 26, 28, 30 may rotate with respect to the frame 22, and the shape-memory alloy 18 may be supported by, and travel along, the wheels 24, 26, 28, 30. Speed of rotation of the wheels 24, 26, 28, 30 may optionally be modified by one or more gear sets 36. Moreover, the second component 20 may include a drive shaft 38 attached to the wheel 26. As the wheels 24, 26, 28, 30 turn about the axles 32, 34 the heat engine 16 rotates in response to the dimensionally expanding and contracting shape-memory alloy 18 and the accompanying changes in modulus.

Heat is transferred when it is absorbed by the shape-memory alloy 18 in one area and when it is desorbed from the shape-memory alloy 18 in another area. Additionally, the martensite to austenite phase transformation of the shape-memory alloy 18 is endothermic, and the austenite to martensite transformation is exothermic. Therefore, as the shape-memory alloy 18 moves between the first fluid region 12 and the second fluid region 14 heat is transferred as the shape-memory alloy 18 undergoes the corresponding phase change. Another way most applications transfer heat would be through the fluid currents created by the operation of the heat engine 16. If further transfer of heat from one of the first fluid region 12 and the second fluid region 14 is required the component 20 may be secured to the heat engine 16 through drive shaft 38, and driven thereby.

Referring again to FIG. 1, the heat transport system is shown generally at 42. The heat transport system 42 includes structure defining the first fluid region 12 having a first temperature and structure defining the second fluid region 14 having a second temperature that is different from the first temperature. The temperature difference between the first fluid region 12 and the second fluid region 14 may result from heat generated by the component 52. For example, the first temperature may be higher than the second temperature. The temperature difference between the first temperature and the second temperature may be as little as about 5° C. and no more than about 300° C. The greater the temperature difference between the first temperature and the second temperature the faster the shape-memory alloy 18 will rotate the wheels 24, 26, 28, 30. The faster operation of the heat engine 16 results from decreasing heating and cooling times of the shape-memory alloy 18 in the first fluid region 12 and the second fluid region 14. Transferring heat from the first fluid region 12 to the second fluid region 14 assists in reducing the temperature, or alternatively increasing the temperature, of the first fluid region 12 or second fluid region 14 and the component 52.

As shown generally in FIG. 1, the heat engine 16, and more specifically, the shape-memory alloy 18 (FIG. 2) of the heat engine 16, is disposed in thermal contact or heat exchange relation with each of the first fluid region 12 and the second fluid region 14. Therefore, the shape-memory alloy 18 may change crystallographic phase between austenite and martensite upon thermal contact with one of the first fluid region 12 and the second fluid region 14. For example, upon thermal contact with the first fluid region 12, the shape-memory alloy 18 may change from martensite to austenite. Likewise, upon thermal contact with the second fluid region 14, the shape-memory alloy 18 may change from austenite to martensite.

Further, the shape-memory alloy 18 may change both modulus and dimension upon changing crystallographic phase to thereby convert thermal energy to mechanical energy. More specifically, the shape-memory alloy 18, if pseudoplastically pre-strained may dimensionally contract upon changing crystallographic phase from martensite to austenite and may dimensionally expand, if under tensile stress, upon changing crystallographic phase from austenite to martensite to thereby convert thermal energy to mechanical energy. Therefore, for any condition wherein the temperature difference exists between the first temperature of the first fluid region 12 and the second temperature of the second fluid region 14, i.e., wherein the first fluid region 12 and the second fluid region 14 are not in thermal equilibrium, the shape-memory alloy 18 may dimensionally expand and contract upon changing crystallographic phase between martensite and austenite. And, the change in crystallographic phase of the shape-memory alloy 18 may cause the shape-memory alloy to rotate the pulleys 24, 26, 28, 30 and, thus, transfer heat from one of the first fluid region 12 and the second fluid region 14 to the other of the first fluid region 12 and the second fluid region 14.

In operation, with reference to the heat exchange system 42 of FIG. 1 and described with respect to the example configuration of the shape-memory alloy 18 shown in FIG. 2, one wheel 28 may be immersed in or in heat exchange relation with the first fluid region 12 while another wheel 24 may be immersed in or in heat exchange relation with the second fluid region 14. As one area (generally indicated by arrow A) of the shape-memory alloy 18 dimensionally expands when under stress, i.e. dimensionally stretches if under stress, when in contact with the second fluid region 14, another area (generally indicated by arrow B) of the shape-memory alloy 18 that is pseudoplastically pre-strained in contact with the first fluid region 12 dimensionally contracts. Alternating dimensional contraction and expansion of the continuous spring loop form of the shape-memory alloy 18 upon exposure to the temperature difference between the first fluid region 12 and the second fluid region 14 may cause the shape-memory alloy 18 to convert potential mechanical energy to kinetic mechanical energy, and thereby driving the pulleys 24, 26, 28, 30 and converting thermal energy to mechanical energy. Additionally, heat is absorbed and desorbed from the shape-memory alloy 18 as the shape-memory alloy 18 changes phase and passes through the first fluid region 12 and the second fluid region 14. The heat absorption and desorption results in a transfer of heat from one of the first fluid region 12 and the second fluid region 14 to the other of the first fluid region 12 and the second fluid region 14.

Referring again to FIG. 1, the heat engine 16 may be disposed within the compartment 40 of the vehicle 10. In particular, the heat engine 16 and first component 52 may be disposed in any location within and proximate to the vehicle 10 as long as the shape-memory alloy 18 is disposed in thermal contact or heat exchange relation with each of the first fluid region 12 and the second fluid region 14. Further, the heat engine 16 may be surrounded by a vented housing 44 (FIG. 1) to allow fluid flow while protecting the heat engine 16 from outside contaminants. The housing 44 may also define cavities (not shown) through which electronic components, such as wires may pass. The barrier 50 may be located within the housing 44 or compartment 40 to separate the first fluid region 12 from the second fluid region 14.

Referring now to FIG. 1, in one variation, the heat transport system 42 also includes an electronic control unit 46. The electronic control unit 46 is in operable communication with the vehicle 10. The electronic control unit 46 may be, for example, a computer that electronically communicates with one or more controls and/or sensors of the heat transport system 42. For example, the electronic control unit 46 may communicate with and/or control one or more of a temperature sensor within the first fluid region 12, a temperature sensor within the second fluid region 14, etc. The electronic control unit 46 may control the operation of the heat transport system under predetermined conditions of the vehicle 10. For example, after the vehicle 10 has operated for a sufficient period of time to ensure that a temperature differential between the first fluid region 12 and the second fluid region 14 is at an optimal difference. An electronic control unit 46 may also provide the option to manually override the heat engine 16 to allow the heat transport system 42 to be turned off.

It is to be appreciated that for any of the aforementioned examples, the vehicle 10 and/or the heat transport system 42 may include a plurality of heat engines 16 and/or a plurality of first components 52. That is, one vehicle 10 may include more than one heat engine 16 and/or first component 52. For example, one heat engine 16 may cool more than fluid regions and more than one first component 52. Likewise, vehicle 10 may include more than one heat transport system 42, each including at least one heat engine 16. Multiple heat engines 16 may take advantage of multiple regions of temperature differentials throughout the vehicle and to cool or heat multiple fluid regions and first components 52.

Figure 3:
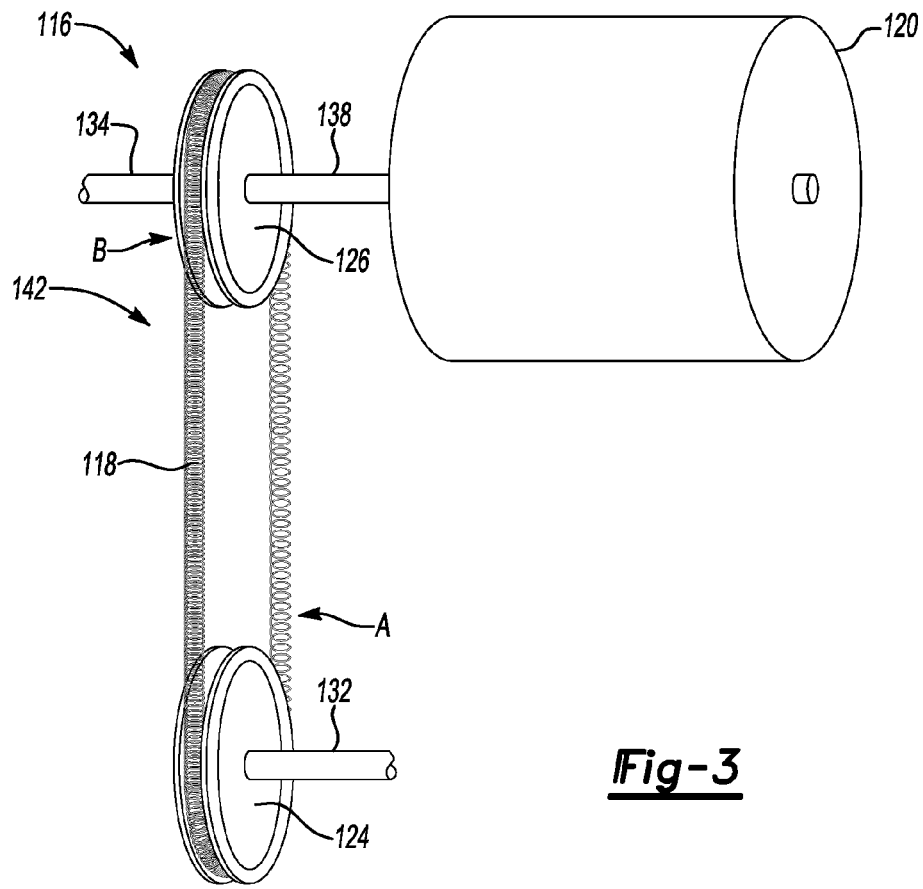
FIG. 3 is a perspective view of a second embodiment of the heat transport system of FIG. 1.

Referring to FIG. 3, a second embodiment of a heat engine 116 for a heat transport system 142 is illustrated. The heat engine 116 includes a shape-memory alloy 118 having a crystallographic phase changeable between austenite and martensite in response to the temperature difference of the first fluid region 12 and the second fluid region 14 (FIG. 1). The shape-memory alloy 118 operates in a similar manner to the shape-memory allow 18 as described above. Further, the shape-memory alloy 118 may have any suitable form, i.e., shape. For example, the shape-memory alloy 118 may have a form selected from the group including springs, tapes, wires, bands, continuous loops, and combinations thereof.

Operation of the heat engine 116 causes heat to move from one of the first fluid region 12 and the second fluid region 14 to the other of the first fluid region 12 and the second fluid region 14. Heat is transferred when it is absorbed by the shape-memory alloy 118 in one of the first fluid region 12 and the second fluid region 14 and when it is desorbed from the shape-memory alloy 18 in the other of the first fluid region 12 and the second fluid region 14. Additionally, heat is transferred through the fluid currents created by the operation of the heat engine 116. If further transfer of heat from one of the first fluid region 12 and the second fluid region 14 is required a second component 120, such as a fan, may be secured to the heat engine 116 and driven thereby. The second component 120 may increase the fluid flow from one of the first fluid region 12 and the second fluid region 14 to the other of the first fluid region 12 and the second fluid region 14. Operation of the heat engine 116 is further described below.

The second component 120 may be a simple mechanical device, such as a fan, which is driven by the heat engine 116 to increase the fluid flow between the first fluid region 12 and the second fluid region 14 (shown in FIG. 1). The mechanical energy from the heat engine 16 may drive the second component 20. Driving the second component 20 with power provided by the heat engine 16 allows the cooling system 42 to operate autonomously from other system of the vehicle 10. Additionally, reducing the temperature of the first component 52 may also allow an existing system within the vehicle 10 to be decreased in size/capacity or reduced operating time and power. For example, the heat engine 16 may assist in cooling a vehicle engine and thus decrease the cooling load required by the main heating/cooling system of the vehicle.

The second component 120 is driven by the heat engine 116 as the heat engine 116 operates to cool the first component 52, the first fluid region 12 or the second fluid region 14. That is, mechanical energy resulting from the conversion of thermal energy by the shape-memory alloy 118 may drive the second component 120. In particular, the aforementioned dimensional contraction and the dimensional expansion of the shape-memory alloy 118 in combination with the accompanying change in modulus may drive the component 120.

The heat engine 116 may include wheels 124 and 126 disposed on a plurality of axles 132 and 134. The axles 132 and 134 may be supported by various components of the vehicle 10. The wheels 124 and 126 may rotate with respect to the vehicle 10 components, and the shape-memory alloy 118 may be supported by, and travel along, the wheels 124 and 126. The second component 120 may include a drive shaft 138 attached to the wheel 126. As the wheels 124 and 126 turn about the axles 132 and 134 in response to the dimensionally expanding and contracting shape-memory alloy 118 and the accompanying changes in its modulus, the drive shaft 138 rotates and removes heat from one of the first fluid region 12 and the second fluid region 14.

Referring to FIGS. 1 and 3, the heat engine 116, and more specifically, the shape-memory alloy 118 of the heat engine 116, is disposed in thermal contact or heat exchange relation with each of the first fluid region 12 and the second fluid region 14. Therefore, the shape-memory alloy 118 may change crystallographic phase between austenite and martensite upon contact with one of the first fluid region 12 and the second fluid region 14. For example, upon contact with the first fluid region 12, the shape-memory alloy 18 may change from martensite to austenite. Likewise, upon contact with the second fluid region 14, the shape-memory alloy 118 may change from austenite to martensite.

Further, the shape-memory alloy 118 may change dimension upon changing crystallographic phase to thereby convert thermal energy to mechanical energy. More specifically, the shape-memory alloy 118 may dimensionally contract when pseudoplastically pre-strained upon changing crystallographic phase from martensite to austenite and may dimensionally expand when under tensile stress upon changing crystallographic phase from austenite to martensite to thereby convert thermal energy to mechanical energy. Therefore, for any condition wherein the temperature difference exists between the first temperature of the first fluid region 12 and the second temperature of the second fluid region 14, i.e., wherein the first fluid region 12 and the second fluid region 14 are not in thermal equilibrium, the shape-memory alloy 118 may dimensionally expand and contract upon changing crystallographic phase between martensite and austenite. And, the change in crystallographic phase of the shape-memory alloy 118 may cause the shape-memory alloy to rotate the pulleys 124 and 126 and, thus, cool the first component 52.

In operation, one wheel 128 may be immersed in or in heat exchange relation with the first fluid region 12 while another wheel 124 may be immersed in or in heat exchange relation with the second fluid region 14. As one area (generally indicated by arrow A) of the shape-memory alloy 118 under applied tensile stress dimensionally expands when in contact with the second fluid region 14, another area (generally indicated by arrow B) of the shape-memory alloy 118 that is pseudoplastically pre-strained and in thermal contact or heat exchange relation with the first fluid region 12 dimensionally contracts. Alternating dimensional contraction and expansion of the continuous spring loop form of the shape-memory alloy 118 along with the accompanying change in modulus upon exposure to the temperature difference between the first fluid region 12 and the second fluid region 14 may cause the pulleys 124 and 126 to rotate in response to the dimensionally expanding and contracting shape-memory alloy 118.

Heat is transferred when it is absorbed by the shape-memory alloy 118 in one area and when it is desorbed from the shape-memory alloy 118 in another area. Additionally, the martensite to austenite phase transformation of the shape-memory alloy 118 is endothermic, and austenite to martensite transformation is exothermic. Therefore, as the shape-memory alloy 118 moves between the first fluid region 12 and the second fluid region 14 heat is transferred as the shape-memory alloy 118 undergoes the corresponding phase change. Another way most applications transfer heat would be through the fluid currents created by the operation of the heat engine 116. If further transfer of heat from one of the first fluid region 12 and the second fluid region 14 is required the component 120 may be secured to the heat engine 16 through drive shaft 138, and driven thereby.

The heat engine 116 may be disposed within the compartment 40 of the vehicle 10. In particular, the heat engine 116 may be disposed in any location within the vehicle 10 as long as the shape-memory alloy 118 is disposed in contact with each of the first fluid region 12 and the second fluid region 14. As described above, the heat engine 16 may be surrounded by a vented housing 44 (FIG. 1) to allow fluid flow while protecting the heat engine 16 from outside contaminants. The housing 44 may also define cavities (not shown) through which electronic components, such as wires may pass. A sufficient heat exchange barrier 50 may be located within the housing 44 or compartment 40 to separate the first fluid region 12 from the second fluid region 14.

In one variation, the heat transport system 142 also includes an electronic control unit 146. The electronic control unit 146 is in operable communication with the vehicle 10. The electronic control unit 146 may be, for example, a computer that electronically communicates with one or more controls and/or sensors of the heat transport system 142. For example, the electronic control unit 146 may communicate with and/or control one or more of a temperature sensor within the first fluid region 12, a temperature sensor within the second fluid region 14, etc. The electronic control unit 146 may control the operation of the heat transport system under predetermined conditions of the vehicle 10. For example, the electronic control unit 146 may start the heat transport system 142 after the vehicle 10 has operated for a sufficient period of time to ensure that a temperature differential between the first fluid region 12 and the second fluid region 14 is at an optimal difference. An electronic control unit 146 may also provide the option to manually override the heat engine 116 to allow the heat transport system 142 to be turned off.

It is to be appreciated that for any of the aforementioned examples, the vehicle 10 and/or the heat transport system 142 may include a plurality of heat engines 116 and/or a plurality of first components 52. That is, one vehicle 10 may include more than one heat engine 116 and/or first component 52. For example, one heat engine 116 may heat or cool more than one fluid region and more than one first component 52. Likewise, vehicle 10 may include more than one heat transport system 142, each including at least one heat engine 116. Multiple heat engines 16 may take advantage of multiple regions of temperature differentials throughout the vehicle and to cool multiple fluid regions and first components 52.

While the best modes for carrying out the invention have been described in detail, those familiar with the art to which this invention relates will recognize various alternative designs and embodiments for practicing the invention within the scope of the appended claims.

The invention claimed is:

1. A system comprising:
    an automotive vehicle including:
        a battery, a battery compartment, an exhaust pipe, a transmission, a brake, and a radiator;
        a first fluid region having a first temperature, and including a component selected from the group of the battery, the battery compartment, the exhaust pipe, the transmission, the brake, and the radiator, the component having an initial component temperature;
        a second fluid region having a second temperature, the second temperature lower than the first temperature;
    a heat engine including a pseudoplastically pre-strained shape-memory alloy having a crystallographic phase disposed in heat exchange contact with the first fluid region and the second fluid region, wherein the alloy is changeable between austenite and martensite in response to a temperature difference between the first fluid region and the second fluid region;
    wherein the heat engine is operable to transfer heat from the first fluid region to the second fluid region in response to the crystallographic phase of the shape-memory alloy;
    wherein the heat engine transfers heat from the first fluid region to the second fluid region to thereby reduce a temperature of the component below the initial component temperature; and
    wherein at least one of the first fluid region and the second fluid region includes a fluid that is air.

2. The vehicle of claim 1, further comprising a second component driven by said heat engine to increase the transfer of heat from the one of the first fluid region and the second fluid region; and wherein the second component includes a fan.

3. The vehicle of claim 2, wherein said change in crystallographic phase of said shape-memory alloy drives said second component.

4. The vehicle of claim 1, wherein said shape-memory alloy changes dimension and stiffness upon changing crystallographic phase to thereby transport heat from the first fluid region to the second fluid region.

5. The vehicle of claim 4, wherein said shape-memory alloy changes crystallographic phase from martensite to austenite and thereby sufficiently dimensionally contracts so as to transfer heat from the first fluid region to the second fluid region.

6. The vehicle of claim 4, wherein said shape-memory alloy changes crystallographic phase from austenite to martensite to transfer heat from the first fluid region to the second fluid region and when under stress sufficiently dimensionally expands so as to reset said shape-memory alloy for transferring heat.

7. The vehicle of claim 1, wherein said shape-memory alloy has a form selected from the group of springs, tapes, wires, bands, continuous loops, and combinations thereof.

8. The vehicle of claim 1, wherein said shape-memory alloy includes nickel and titanium.

9. A system comprising:
an automotive vehicle including:
a first fluid region containing a first fluid having a first temperature;
a second fluid region containing a second fluid having a second temperature, the second temperature lower than the first temperature;
a component disposed within the first fluid region and configured to generate thermal energy;
a heat engine including a pseudoplastically pre-strained shape-memory alloy having a crystallographic phase disposed in heat exchange contact with the first fluid region and the second fluid region, the shape-memory alloy being changeable between austenite and martensite in response to a temperature difference between the first fluid region and the second fluid region;
wherein the heat engine is configured to transport the thermal energy generated by the component from the first fluid region to the second fluid region in response to the crystallographic phase of the shape-memory alloy, the transport including:
absorption of the thermal energy into the shape-memory alloy within the first fluid region;
transport of the thermal energy from the first fluid region to the second fluid region via motion of the shape memory alloy that is induced by the crystallographic phase of the shape-memory alloy; and
desorption of the thermal energy from the shape-memory alloy within the second fluid region; and
wherein at least one of the first fluid and the second fluid is air.

10. The system of claim 9, wherein the first fluid region and the second fluid region are fluidly connected such that fluid may freely move between the respective regions;
wherein the first fluid is induced to flow from the first fluid region to the second fluid region by operation of the heat engine; and
wherein the transport of thermal energy from the first fluid region to the second fluid region via the shape-memory alloy is in addition to a transport of thermal energy caused by the flow of the first fluid from the first fluid region to the second fluid region.

11. The system of claim 10, further comprising a second component rotatably driven by the heat engine and configured to increase the flow of the first fluid from the first fluid region to the second fluid region.

12. The system of claim 11, wherein the second component includes a fan.

13. The system of claim 9, wherein both the first fluid and the second fluid are air.

14. The system of claim 9, wherein the heat engine operates solely using the thermal energy generated by the component disposed within the first fluid region.

\* \* \* \* \*